Jan. 21, 1941.  J. L. COOLEY ET AL  2,229,623
METHOD AND APPARATUS FOR DISTILLATION OF OIL
Filed March 22, 1938
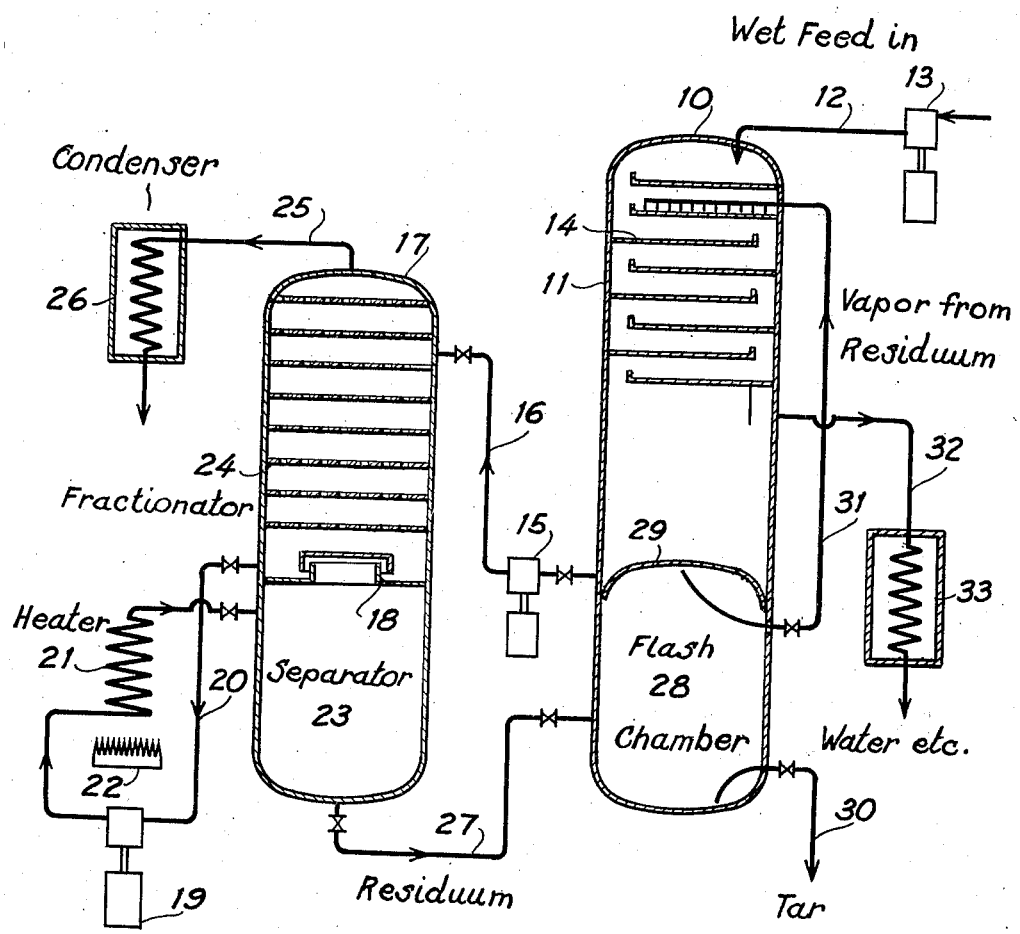
INVENTORS
John L. Cooley
Laverne P. Elliott
Howard B. Nichols
BY /s/ ATTORNEY Patented Jan. 21, 1941

2,229,623

UNITED STATES PATENT OFFICE 2,229,623

METHOD AND APPARATUS FOR DISTILLATION OF OIL

John L. Cooley, Laverne P. Elliott, and Howard B. Nichols, Berkeley, Calif., assignors to Standard Oil Company of California, San Francisco, Calif., a corporation of Delaware Application March 22, 1938, Serial No. 197,432

6 Claims. (Cl. 196—49)

This invention relates to methods and apparatus for cracking hydrocarbon oils, particularly where the incoming charging stock may contain an appreciable amount of water, and particularly refers to an improved method for removing such water, together with any light fractions that may be present, by concurrent flow contact with vapors flashed off of cracked tar or residuum from the subsequent cracking process, said removed materials being withdrawn in the vapor phase.

Heretofore, dehydration or water removal from the charging stock or feed has been done by counterflow contact with such vapors, with the result that the water could not escape from the system in vapor form, due in part to the relatively low temperature of the vapor line outlet from a conventional counterflow condenser, and consequently such water rapidly accumulated in the counterflow condenser until it produced surges and foaming.

It is an object of this invention to provide a method and apparatus for the utilization of heat contained in vapors from cracked tar or residuum from a cracking operation to process the incoming charging stock continuously to remove water and light petroleum fractions therefrom in the vapor phase, and at the same time to condense and return to the general distillation or cracking system the heavy fractions that may be present in the vapors from said tar or residuum.

Another object is to provide an apparatus which is appreciably smaller and less expensive than that required for previously employed counterflow contacting processes. Concurrent flow operation effects this chiefly through decrease in the required size of the contacting vessel.

These and other objects and advantages will be more fully apparent from the following description and from the accompanying drawing, which forms a part of this specification and illustrates diagrammatically a preferred form of apparatus suitable for carrying out the invention.

In the drawing, the reference numeral 10 generally indicates a concurrent liquid-vapor contactor, into the upper portion 11 of which raw feed or liquid hydrocarbon charging stock from any suitable source is continuously introduced through line 12 by a pump 13. The feed passes downwardly over a series of vertically spaced plates or baffles 14 to the bottom of the upper section 11, meanwhile being contacted by hot vapors, as will be explained in greater detail below. The dehydrated and partially heated liquid feed, containing the condensed portion of the above mentioned vapors, is withdrawn from the lower part of chamber 11, which forms a separating zone, by pump 15 and is introduced through line 16 into a conventional fractionating column 17. Liquid reflux accumulating above the collector baffle 18 of column 17 is withdrawn by pump 19 through line 20 and passed into and through the cracking coil or furnace 21, where its temperature is raised to the desired degree as by the burner generally designated 22.

The heated material from coil 21 passes into the lower chamber or separating section 23 of fractionating column 17, where the vaporized and unvaporized portions are separated, the vapors rising through collector baffle 18 to be fractionated by the reflux liquid flowing downwardly through baffles 24 in column 17, the finally desired vapors escaping through line 25 for condensation in cooler 26.

Unvaporized residuum from the separating chamber 23 is continuously withdrawn through line 27 and is throttled at a lower pressure into a flash chamber or separating chamber 28, which may conveniently although not necessarily be located in the lower part of the shell of contactor 10, and, in the example, is separated from upper portion 11 by a tight baffle or diaphragm 29. The flash chamber 28 may be operated at pressures either above or below atmospheric, but usually at a pressure appreciably lower than that existing in the vapor column 17. Flashing or vaporization of part of the incoming oil occurs in flash chamber 28. Unvaporized residuum or tar after flashing is withdrawn from chamber 28 by line 30 and is suitably cooled or otherwise disposed of. Vapors from the flashing operation in chamber 28 are separately withdrawn from the upper part thereof through line 31, and are conducted therethrough to the upper part of the upper portion 11 of the contactor 10, where said vapors contact the incoming raw feed and pass downwardly therewith over or through baffles 14, heating said feed to a point high enough to vaporize the water contained therein. The temperature required for this purpose is dependent upon several factors, including the operating pressure employed, and the percentage of water and light vaporizable hydrocarbons in the charging stock.

Vaporized water, together with vaporized light hydrocarbon fractions that may be present in the feed are separated from liquid passing downwardly and are withdrawn in the vapor phase from chamber 11 at a point below the baffles 14, as through line 32, and may be condensed in cooler 33. The unvaporized portion of the feed stock, together with heavier fractions condensed from the flashed residuum vapors, are separately withdrawn in the liquid phase from the lower part of upper section 11 through line 16 and are passed by pump 15 into the cracking system fractionating column 17, forming the feed to said system, as has already been explained.

The advantage of such a mode of operation over the counterflow treatment previously used is primarily in the avoidance of abrupt surges due to water in the feed stock. The surges which occur with a counterflow arrangement are a hazard to safe operation of the equipment, due to abrupt changes in the quantities of vapor discharged from such an arrangement into its conventional condensing system, due to the possibility of "bumping" or abrupt vaporization of large quantities of water with the attendant danger of destroying the plates or baffles in the contactor, and due to the possibility of getting water into the feed line to the fractionating column to which the counterflow contactor discharges liquid feed. A surge of water entering such a fractionating column would be abruptly vaporized and might seriously damage or even destroy the baffles or plates in that column.

Operation of previously used counterflow contactors gave overhead or vapor line temperatures of about 150° F. and bottom or mixed feed temperatures of about 350° F. to 450° F. Under these conditions essentially no water could leave the jet condenser or contactor as liquid at the bottom, and an insufficient amount could leave as vapor through the vapor line. The unrejected portion would accumulate near the middle of the jet condenser vessel and would be rejected at intervals in surges through the vapor line.

As an example of operation, a concurrent flow contactor installation embodying this invention was maintained at about 5 to 10 lbs. per square inch pressure, raw feed at substantially atmospheric temperature was introduced at the top, vapors from the flashed residuum were also admitted thereto at about 750°-800° F., the vapor temperature of line 32 was about 250°-300° F. and the treated feed was heated to about 350°-450° F. This has produced continuous smooth operation in a number of very large installations over an adequate period to prove its advantages.

Although a single illustration of the mode of operation and an apparatus suitable therefor have been shown and described, it is obvious that the invention is not so limited, and all modifications and changes that come within the scope of the appended claims are embraced thereby.

We claim:

1. In a dehydrating operation for a liquid phase cracking system in which cracked hydrocarbons are separated into a vaporized portion and an unvaporized residuum which is flashed to vapor and liquid by lowering the pressure, the steps of separating the flashed vapor from the residuum liquid, passing said vapor in concurrent flow with the liquid feed to said cracking system through a contacting zone and into a separating zone, withdrawing vaporized water and vaporized light hydrocarbons from said separating zone, and passing said unvaporized feed liquid from said separating zone to said cracking system.

2. A method according to claim 1 in which said withdrawn vaporized water and vaporized light hydrocarbons from said separating zone are passed into a condensing zone.

3. A method of removing water from a liquid hydrocarbon feed stream to a cracking system, comprising the steps of reducing the pressure on the residuum from said system to vaporize a part of said residuum, passing said vapor in concurrent flow and in intimate contact with said liquid feed stream to vaporize the water therein, separating said vaporized water from said stream and passing said dehydrated liquid feed stream to said cracking system.

4. A method according to claim 3 in which said withdrawn vaporized water is subsequently condensed.

5. In combination with an oil cracking system, a flash chamber for residuum from said cracking system, a liquid-vapor contactor comprising a chamber containing a series of vertically spaced baffles, means for introducing liquid hydrocarbons into the upper part of said chamber so that they will pass downwardly through said baffles, means for conducting vapor from said flash chamber into the upper part of said chamber so that it will pass downwardly with said liquid through said baffles, vapor withdrawal means in said contactor below said baffles, and separate means in the lower part of said chamber for withdrawing liquid therefrom and conducting it to said cracking system.

6. In combination with an oil cracking system, a flash chamber for residuum from said cracking system, a second chamber, means for introducing liquid hydrocarbons into said second chamber, means for conducting vapor from said flash chamber to said second chamber adjacent the inlet thereof so that it will intimately contact said incoming liquid hydrocarbons, vapor withdrawal means in said second chamber below the vapor inlet thereto, and means in the lower part of said second chamber for withdrawing liquid therefrom and conducting it to said cracking system.

LAVERNE P. ELLIOTT.
JOHN L. COOLEY.
HOWARD B. NICHOLS.